May 11, 1954   J. D. BUHLER ET AL   2,678,205
SYSTEM FOR HEAT TREATING SHAPED BODIES
Filed June 8, 1950   6 Sheets-Sheet 4
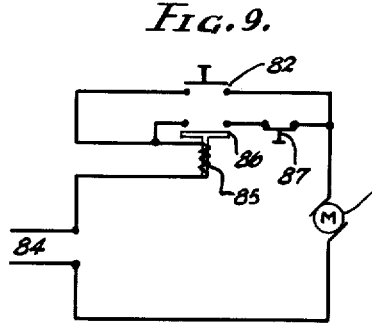
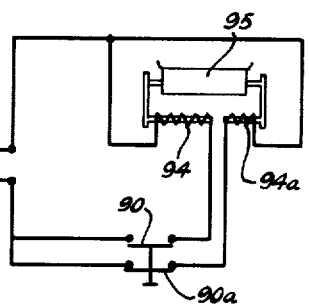
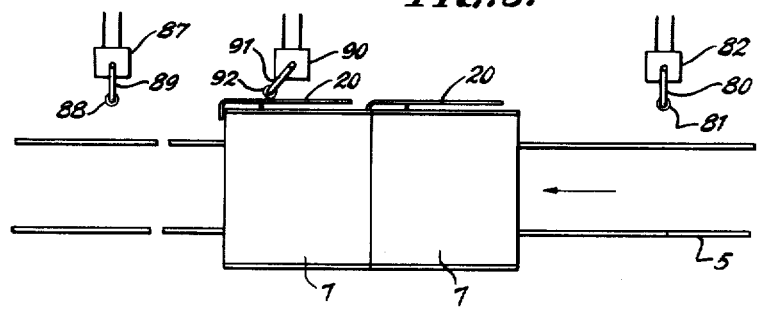
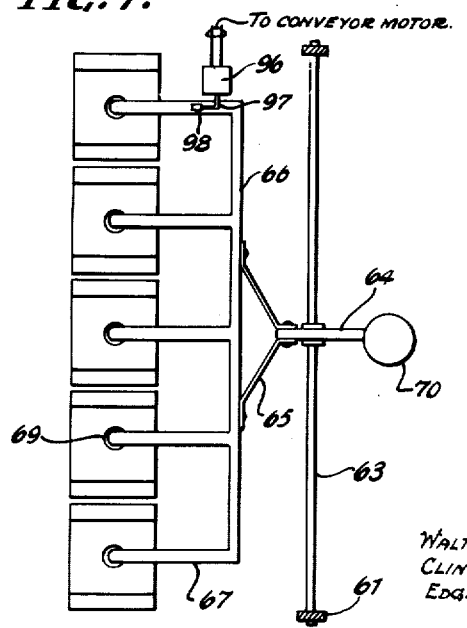
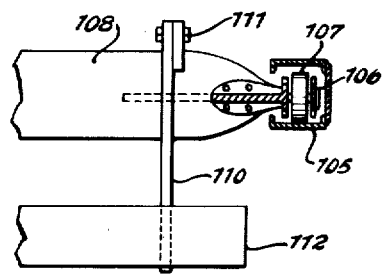
INVENTORS
WALTER H. BAST. JAMES D. BUHLER.
CLINTON B. FOLKROD. RUSSELL O. GUNDERSON.
EDGAR F. HENDERSON. JAMES P. SWANN.
BY James E. Toomey
ATTORNEY

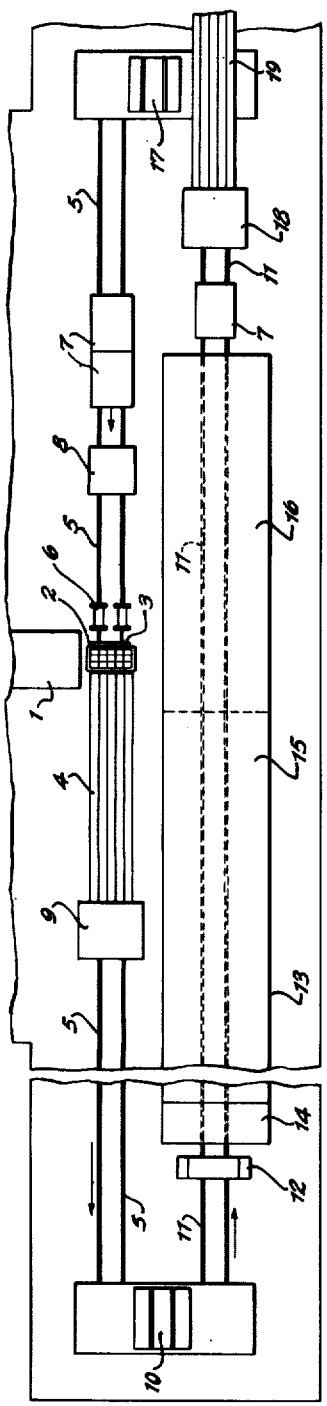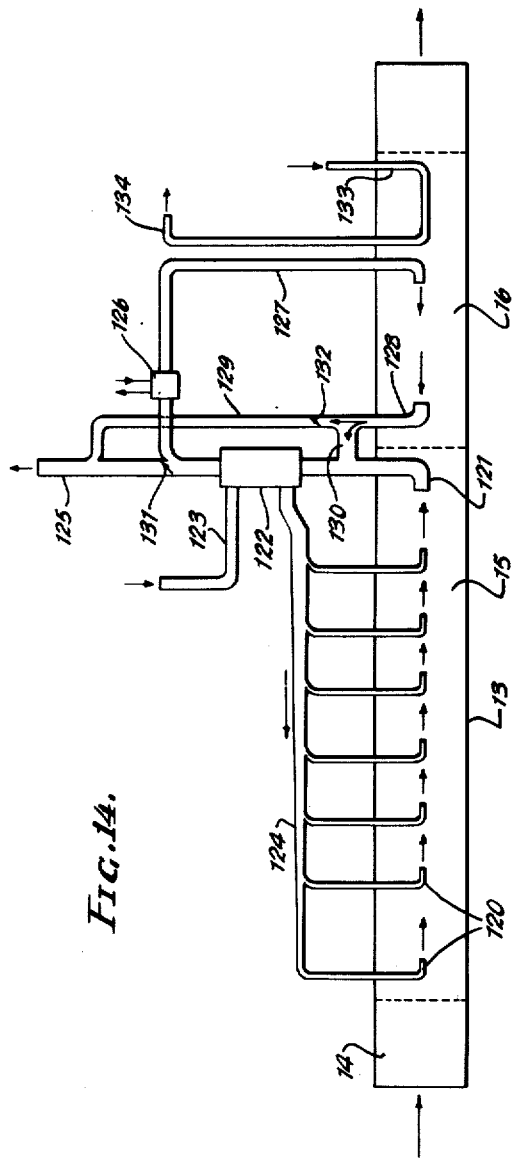

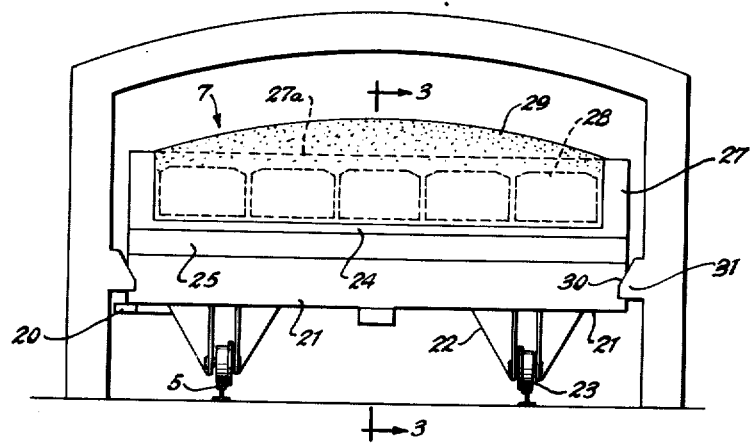
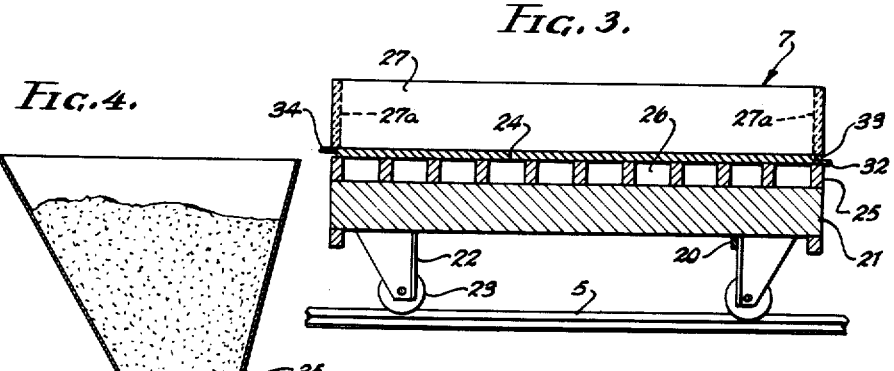
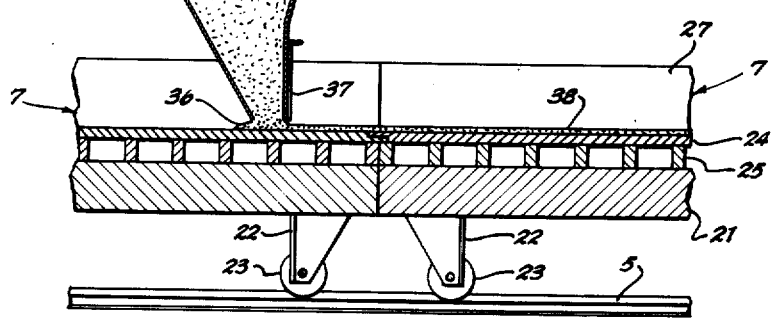

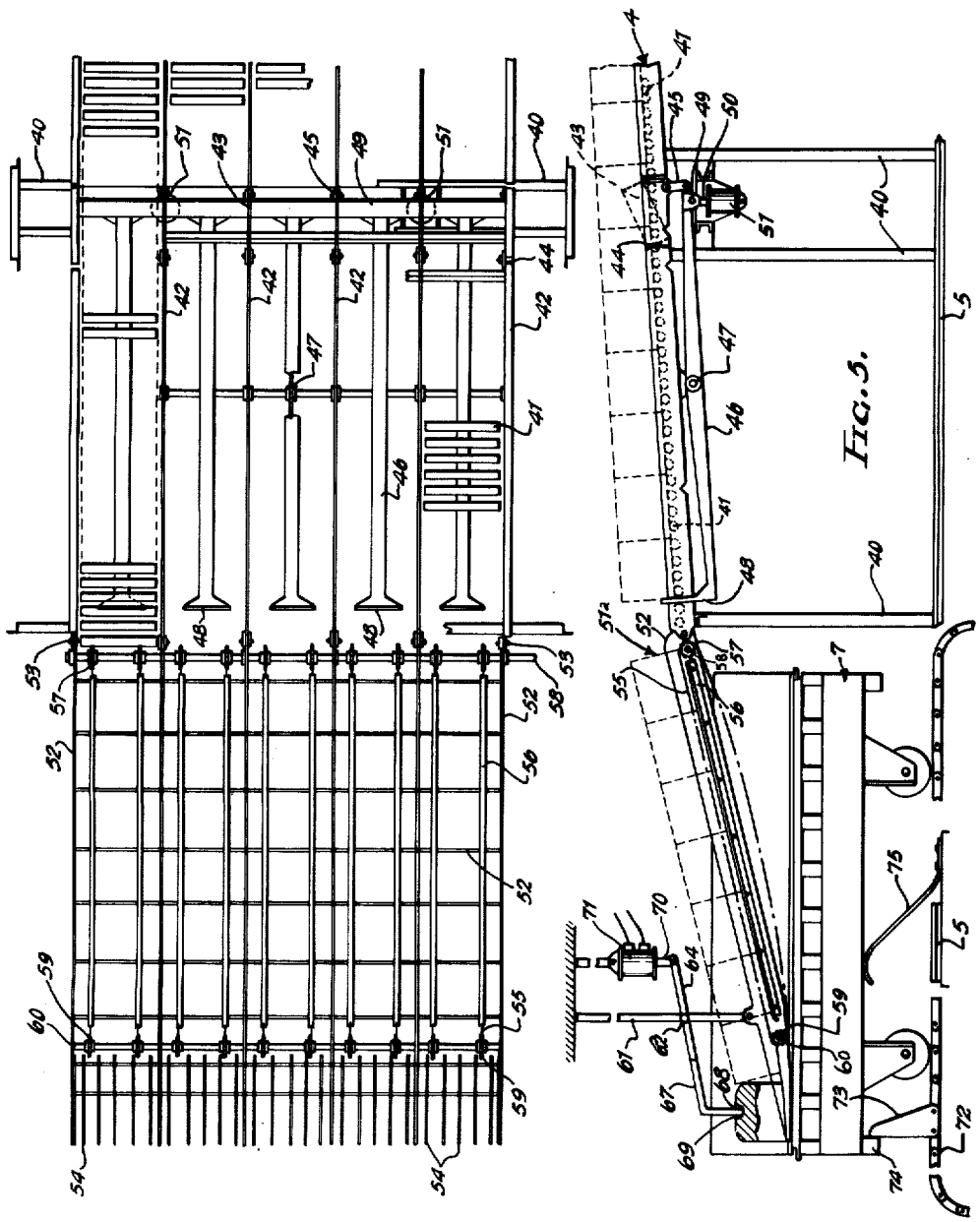

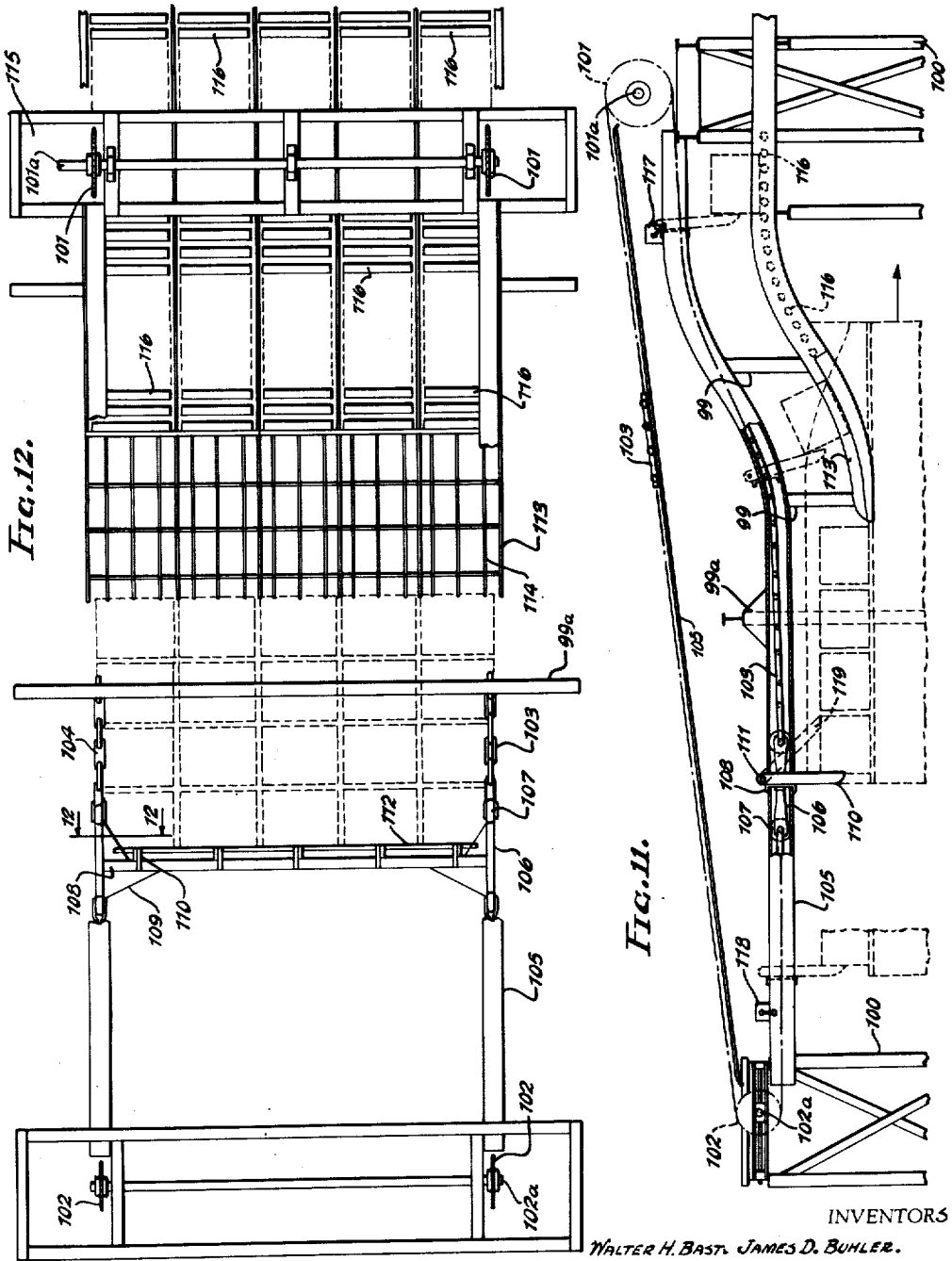

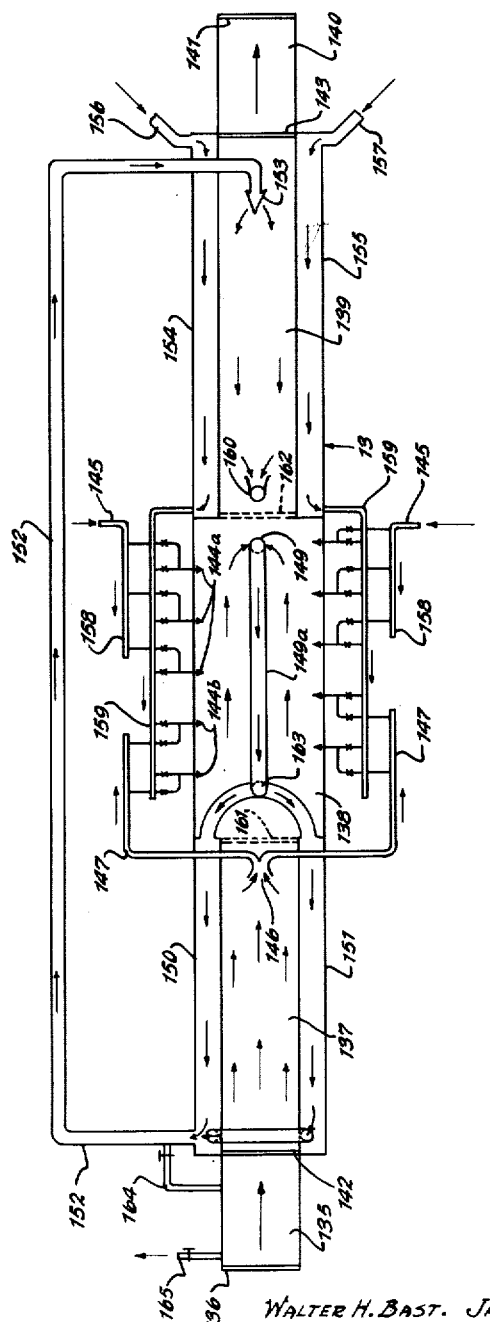

Patented May 11, 1954

2,678,205

UNITED STATES PATENT OFFICE 2,678,205

SYSTEM FOR HEAT TREATING SHAPED BODIES

James D. Buhler, Clinton B. Folkrod, and Russell O. Gunderson, Spokane, Wash., assignors to Kaiser Aluminum & Chemical Corporation, Oakland, Calif., a corporation of Delaware Application June 8, 1950, Serial No. 166,926

15 Claims. (Cl. 263—28)

The present invention relates to a continuous kiln system for the heat treatment of shaped bodies composed of combustible or oxidizable material. More particularly, the invention relates to a continuous method and apparatus including a tunnel kiln for the baking or calcining of shaped carbon bodies.

In the manufacture of shaped carbon bodies, such as electrodes, the green shapes from the press usually composed of a carbonaceous filler and a hydrocarbon binder, for example, calcined petroleum coke and tar pitch, respectively, require further treatment to impart thereto the desired properties. These bodies are therefore baked or calcined to eliminate the remaining volatiles, principally contained in the binder, thus carbonizing the binder, and to harden the mass thereby imparting the desired strength density and electrical conductivity to the finished electrode or other carbon body.

Various furnaces have been employed in baking or calcining carbon bodies, among which may be mentioned gas-fired pit furnaces of the muffle type, electrically heated pit furnaces wherein the green electrodes or bodies form the resistance element, and ring furnaces having a plurality of chambers operating more or less sequentially on a cycle including loading, preheating, heating, cooling and unloading. All of these means for baking involve several disadvantages, chief among which is the fact that the combustible or oxidizable carbon bodies must be cooled to below oxidation temperatures before unloading the furnace or furnace chamber. This necessitates alternately reheating and cooling the entire mass of the furnace or chamber wherein firing occurs. Thus, after cooling to about 400° C., the entire furnace or chamber must later be brought back up to baking temperature (about 1500° C.) for calcining an additional charge of green carbons. In addition to this limitation, the complete cycle is extremely slow in these furnaces consisting of a multitude of stationary chambers and operating on alternating heating and cooling phases, primarily due to the inherent slow rate of cooling which requires that the number of chambers undergoing cooling be disproportionate to the number preheating or heating. Consequently the heating rate is seriously limited. Thus, the time required for baking relatively large carbon electrodes such as are employed in the aluminum reduction pots ranges from two to three weeks in such furnaces.

Tunnel kilns are, of course, common in the ceramic and refractory industries for firing the particular articles manufactured, such as pottery, china or bricks. However, the problems encountered in these arts are not common or analogous to the many problems confronted in the production of shaped carbon bodies, which latter are combustible at temperatures around 450° C. and which must, therefore, be protected from exposure to an oxidizing atmosphere during heating and cooling. Moreover, the green carbon bodies, and in some instances the packing material protecting the same, contain volatiles which are distilled off in heating. Disposition of such volatiles is a problem not encounterd in the above-mentioned industries.

The shaped carbon bodies to be calcined are usually protected during baking by a blanket of coke dust or other carbonaceous or suitable material which effectively prevents contact between the electrodes or other bodies and an oxidizing atmosphere such as air. Also with combustible packing material, the cooling atmosphere cannot be oxidizing. In firing ceramics and refractories no such precautions are required and in the absence of such packing material the articles may simply be passed through a tunnel kiln on cars upon which pallets bearing the articles are carried. Such an arrangement would not be feasible in baking carbon electrodes, for example, carbon anodes to be used in the electrolytic production of aluminum.

Accordingly, it is a primary object and purpose of this invention to provide a system and method embracing a continuous tunnel kiln of the direct fired type which is particularly adapted for the baking or calcining of shaped bodies of combustible or oxidizable materials, such as carbon electrodes.

A further object is to provide a continuous method and apparatus for baking or calcining shaped carbon bodies including a tunnel kiln wherein the time required for baking a given charge is substantially curtailed by reason of the fact that the high temperature zone of the furnace may be maintained at the desired maximum temperature without necessitating alternate cooling and heating, and heating rates may substantially exceed those now commonly employed, such heating rates being comparatively less dependent on the cooling rates. Additionally higher cooling rates are obtainable.

The system also includes a novel principle of utilizing volatiles from the kiln charge as a substantial portion of the fuel required by removing such volatiles given off from the charge and recirculating them to desired points for combustion, or by directly burning in the combustion zone.

The invention further contemplates a gas flow pattern in conjunction with the tunnel kiln wherein the combustion gases flow concurrent or countercurrent to the direction of travel of the shaped bodies in the firing zone, air for the kiln burners or the incoming charge is heated by the exhausted products of combustion, which latter in cooled condition are passed countercurrently over the contents of the loaded kiln cars in a cooling zone to provide an inert atmosphere, and further cooling is effected by indirect heat exchange with air or other suitable heat exchange media which air being heated may be supplied directly or indirectly to the burners.

A particular object of the present invention is to provide a system for baking or calcining shaped bodies, such as carbon electrodes, including in combination kiln cars, means for depositing a bed layer of packing material on the cars, means for loading the cars with the green shaped bodies, further feeding means for covering the bodies on the cars with a blanket of packing material, continuous direct-fired tunnel kiln means for rapidly baking the shaped carbon bodies and for cooling the same, means for unloading the baked shapes from the kiln cars, and means for returning the kiln cars to the initial station after removal of packing material.

Still another purpose of the invention is to provide for the alternative use of an inert packing material permitting discharge of the kiln charge at substantially higher temperatures than is permissible with combustible packing material with the advantage that the cooling zone may be shortened or the heating rate increased.

Another object is to provide in conjunction with the continuous tunnel kiln, kiln cars for directly receiving the shaped carbon bodies and a blanket of so-called packing material, such cars being so constructed that packing material may be continuously fed to a train of cars in end to end abutment and the carbon bodies may be continuously or semi-continuously loaded thereon and unloaded therefrom. The said kiln cars are further constructed to permit uniform heating of the carbon bodies by provision of means for heating both the top and bottom of the car load.

Still another object is to provide an automatic or semi-automatic means for loading the shaped green bodies upon the kiln cars in a continuous or semi-continuous manner whereby the loading means deposits a predetermined number of bodies upon each car in orderly arrangement with selected spacing between adjacent bodies, which spacing is adjustable within certain limits. It is further provided that actuation of the loading means will be synchronized and indexed with the car which is moving during the loading operation.

Another object is to provide a continuous automatic unloading means operating in conjunction with the movement of the kiln cars for removing the baked shaped bodies from the cars and simultaneously separating them from the blanket of packing material left on the cars. Provision is further made for collecting the unconsumed packing material, if composed of coke calcined by the passage through the kiln, and using this material as a component of the raw material from which the shaped carbon bodies are prepared.

These and other objects and advantages of the invention will become apparent from the following detailed description thereof, which is specifically directed to the baking of the relatively large carbon electrodes intended for use in the electrolytic production of aluminum, although it is not intended to limit the invention thereto, the same being applicable generally to the baking of shaped bodies of combustible or oxidizable material, and in particular shaped bodies of carbon.

*The kiln system and process*

The tunnel kiln is generally the direct fired elongated straight type comprised essentially of three sections or zones; an entrance or preheating zone, a firing zone, and a cooling zone. The firing or combustion zone is provided with a plurality of burners from which the propagated flames and products of combustion impinge more or less directly on and around the load. The fuel preferred is oil, although natural gas, or manufactured gas may be employed with satisfactory results. In any event the volatiles of the charge will supply a substantial portion of the fuel. The flow of combustion gases in the firing zone may be concurrent or countercurrent to the direction of movements of the charge, although the former is preferred.

The entrance or preheating zone may be one in which flow of gas directly into or from the firing zone is substantially precluded and in which the charge is preheated by indirect heat exchange with the combustion gases from the firing zone thereby cooling the latter. On the other hand, the entrance zone may be in completely open relationship with the firing zone. In this alternative, the entrance zone is preferably relatively short and is maintained at a progressively increasing temperature in the direction of the firing zone merely by the proximity thereto and open connection therewith. The combustion gases in such case are exhausted from the firing zone either at the forward or rear end thereof, but preferably the latter. The cooling zone following the firing zone is substantially closed off to any passage of gases from the latter. A particular feature of the invention is the cooling of the charge by direct heat exchange with cooled combustion gases flowing countercurrent to the direction of movement of the charge and providing an inert atmosphere protecting the charge from oxidation.

Cooling is also effected by indirect heat exchange with a suitable heat exchange medium such as air, preferably forced through flues or passages in the kiln wall. This air, thus preheated is utilized as primary or secondary air for supporting combustion at the burners in the firing zone with or without an intermediate heat exchange with exhausted combustion gases going to the stack.

In that embodiment where communication of gases between the preheating zone and firing zone is precluded, the volatiles from the charge, the major portion of which are distilled in the preheating zone, are collected in the latter zone and drawn off therefrom. They are then circulated to the firing zone, where preferably they are subjected to controlled combustion in the burners.

In the embodiment in which the entrance zone and firing zone are in direct communication for passages of gases, the volatiles are drawn from the entrance zone into the firing zone where they are directly burned in situ without controlled combustion conditions. In this case, it is preferable that the flow of combustion gases in the firing zone be concurrent rather than countercurrent to the direction of movement of the charge. In this manner a more complete utilization of the volatiles as fuel is insured, since if the combustion gases flow countercurrently and are exhausted at the forward end of the firing zone, a portion of the volatiles may also be exhausted before burning.

The heat treatment as applied to calcination of shaped carbons, for example, carbon electrodes, involves more or less conventional temperature ranges. The entrance or preheating zone temperature range may vary widely, depending upon several factors including the desired maximum temperature to which the charge is to be fired. Ordinarily, however, the maximum entrance zone temperature will not exceed about 900° C.

In the firing zone, the temperature range may vary from about 900 to somewhat above about 1500° C. The temperature of the charge will be correspondingly lower and the maximum temperature employed in the firing zone will be dictated by the selected maximum or final temperature to be attained by the charge.

In the conventional ring furnace operation heating rates of from about seven to ten degrees per hour are attainable. As mentioned above, these slow rates are dictated by cooling capacity requirements. It is possible by means of the present invention to accomplish the calcination or heat treatment at higher rates, for example, 30° C. per hour.

The carbons are passed through the preheating and firing zones, as described above, and are then forwarded to the cooling zone wherein cooling is effected at the maximum attainable rate, for example about 20° C. per hour. The charge may be discharged from the cooling zone upon reaching a temperature below that of combustion of the packing material, if combustible. This temperature with coke, calcined by passage through the kiln, as packing material is about 400° C. However, the invention also contemplates the use of inert packing material, such as gannister, crushed fire clay, crushed brick, sand or alumina, in which case the charge may be removed from the cooling zone at higher temperatures, such as for example 700° C. As a result, the cooling zone may be made relatively shorter for a given selected maximum firing temperature. Alternatively, the heating rate may be increased while holding the cooling zone the same length for a given selected maximum firing temperature.

In regard to kiln dimensions generally, they are dictated primarily by the desired production capacity, although the invention contemplates a kiln width sufficient to accommodate a plurality of carbon electrodes of maximum size disposed in transverse rows, for example, four or five. For a given width the capacity will then vary with kiln length. In the kiln regardless of length, the relative combined lengths of the preheating and heating zones compared to the cooling zone is dependent on the ratio of the heating rate to the cooling rate, and, as indicated above, on the desired exit temperature for the charge.

General system

The green shaped carbon electrodes after being pressed in molds are transferred from suitable storage, preferably on pallets by suitable mobile means, such as tiering platform trucks, high lift trucks or electric fork trucks to a pallet table or platform mounted above the return track for empty kiln cars. The pallet table is contiguous with a storage conveyor, also situated above the return track for the kiln cars. Each pallet is adapted to carry a selected number of carbons, which are discharged at the pallet platform onto the storage conveyor by any suitable intermittently operated means.

Adjacent to the pallet platform but disposed on the opposite side thereof from the storage conveyor and directly above the kiln car track is a feeding and distributing means for depositing a blanket or bed layer of packing material upon the deck on the kiln car, the structure of which is described in detail below. The kiln cars are positively moved into position by suitable mechanical means, such as truck-tractors. The feeding and distributing means spreads the packing material in a uniform layer of predetermined thickness on the car decks, the cars preferably being passed thereunder as a more or less continuous train with their respective ends abutting.

At the opposite end of the storage conveyor from the pallet table is an intermittently operated kiln car loading mechanism comprising essentially a power conveyor to receive the shaped carbons from the storage conveyor and transfer the same to the kiln cars positively driven at a speed synchronized with that of the power conveyor. The relative speeds of the cars and conveyor may be adjusted within certain limits to vary the spacing between carbons deposited on the car deck. The carbons are transferred across an inclined surface from the power conveyor to the kiln car and the conveyor is of sufficient length to accommodate at least one carload of carbon, preferably a number exactly equal to one carload. The inclined surface is adjustable in slope to provide a selected minimum spacing between the carbons in the one or more longitudinal rows deposited on the car.

A kiln car approaching the leading station is preferably engaged by a positive drive means. The positively driven car as it reaches loading position under the inclined surface actuates the power conveyor upon which a load has been transferred from the storage conveyor transferring in turn a full load to the kiln car, the movement of the latter being indexed and synchronized with the power conveyor and in the same direction as the horizontal component of the moving carbons being transferred.

The cars in the train are thus loaded by intermittent or semi-continuous operation of the loading mechanism and are moved along the track to the entrance end of the kiln. A car transfer mechanism of conventional type may be interposed between the loader and kiln if the direction of travel of the car is reversed and the kiln tracks are parallel to the return track.

At an appropriate exterior location or within the entrance end of the kiln is located a second packing material feeder and spreader disposed above the track. At this station a complete blanket of packing material is deposited between the several carbons, between the shapes and the car walls, and over the tops of the shapes to a selected adjustable depth. The cars at this operation, and during movement through the kiln are held together in end to end abutment forming a train, thus presenting a continuous surface for reception of packing material.

The loaded packed cars are then moved into the kiln to commence the heating cycle described above. The cars are introduced one by one into the kiln in intermittent fashion and with the kiln entirely full, when one car is introduced, a car is discharged at the exit end, the entire train of cars in the kiln moving forward one car length.

A car discharged from the kiln is moved to an appropriate location outside of the exit end of the kiln where a carbon unloading mechanism is disposed in operative position above the track. The unloading mechanism essentially comprises an inclined unloading chute composed of a plurality of skid forks positioned to receive the carbons as the kiln car passes beneath the forks and a pusher for positively forcing the carbons onto the slide forks. At the other end of the elevating skid forks and contiguous therewith is a conveyor means for transferring the baked carbons to the usual cleaning station where adherent packing material is removed. The conveyor may be either of the gravity roll type if the necessary inclination is feasible or it may be power driven.

The skid forks while receiving the carbons from the kiln car also effect a separation of the packing material therefrom, the latter falling between the forks onto the packing material remaining on the car. The packing material is then removed from the car and is advantageously used as a component of the raw material for preparing the shaped bodies. The car having completed a full cycle is then forwarded on the track into position for repeating the cycle.

The invention and the particular features thereof are described in greater detail in conjunction with the accompanying drawings, which are merely illustrative of preferred embodiments, and the invention is not to be construed as limited thereto; in which, Figure 1 is a diagrammatic representation of the general kiln system showing the various work stations, the transfer means therebetween, and the kiln;

Figure 2 is an end elevation of the preferred type of kiln car loaded with carbons and packing material and showing the kiln also in end elevation;

Figure 3 is a longitudinal section taken on line 3—3 of Figure 2 and showing the details of construction of the kiln car with the carbons, packing material and kiln removed;

Figure 4 is a sectional view of the packing material hopper and spreader for the bed layer on the car deck, the cars being also shown in fragmentary vertical section;

Figure 5 is a side elevation of the preferred car loading mechanism with side plates removed to show the conveyor chain, together with the drag chain for driving the car during loading;

Figure 6 is a plan view of the car loading mechanism with parts broken away;

Figure 7 is a fragmentary plan view of the loading fork stop and operating mechanism therefor associated with the car loading mechanism as shown in Figure 5;

Figure 8 is a diagrammatic plan view of the tripping means on the kiln cars and the switches contacted thereby for actuating the loading fork stop and the positive drive for the kiln cars at the loading position;

Figure 9 is a schematic diagram of the control system for the positive drive for the kiln cars at the loading station;

Figure 10 is a schematic diagram of the control system for actuating the loading fork stop of the loading mechanism;

Figure 11 is a side elevation of the carbon unloading mechanism with parts broken away;

Figure 12 is a plan view of the unloading mechanism;

Figure 13 is an enlarged detailed elevational view partly in section of the reciprocating pusher structure taken on line 12—12 of Figure 12;

Figure 14 is a diagrammatic representation of the kiln interior and a gas flow system associated therewith, which includes one embodiment for utilization of the volatiles in which they are directly burned in the kiln; and, Figure 15 is a diagrammatic representation of a kiln in which the volatiles are collected in the preheating zone and reintroduced into the firing zone for combustion as fuel.

*Operation of system*

Figure 1 shows the general system and its operation wherein 1 indicates an apron upon which the pallet transfer trucks are driven, and a pallet 2 carrying a single layer of green carbons three wire by five long or a total of fifteen is placed on pallet platform 3 from which point the carbons are pushed onto a five lane gravity roll storage conveyor 4 situated above track 5, the transfer being effected by hydraulic pushers 6. Kiln cars 7 moving in the direction of the arrow are passed under the hopper and spreader 8 where they receive a bed layer of packing material and then are passed under gravity conveyor 4 to the loading position under the loading mechanism 9 which is synchronized with the positive drive on the car in loading position so that each car is loaded with a predetermined number of carbons, for example, thirty-five in rows five wide by seven long and one high with regulated spacing between each carbon in both transverse and longitudinal rows. Utilizing only a single depth of the carbons when charged on the cars into the kiln is a particularly advantageous feature as it improves both heating and cooling rates.

The loaded kiln cars are then transferred by means of transfer car 10 to track 11 for passage into the kiln 13. When entering the kiln the cars are passed under the blanket spreading hopper 12 which feeds packing material between and over the carbons to a selected adjustable depth. The loaded cars with the complete blanket of packing material are then passed through the entrance zone 14 of the kiln, and are slowly and intermittently moved through the heating zone 15 of the kiln where the shaped carbons are baked and a portion of the packing material, if raw coke, is calcined. After the carbons have attained the optimum temperature, the cars are passed to the cooling zone 16 of the kiln where the temperature of the carbons is reduced to the desired figure before the cars are discharged from the kiln on track 11. The cars are then forwarded to the car unloading mechanism 18 on kiln track 11, where the carbons are ejected from the cars onto the conveyor 19 to be transferred to the cleaning machine, while at the same time the packing material is left behind on the cars. This calcined packing material is removed from the cars before they start a new cycle at the bed layer hopper 8, the cars being transferred to return track 5 by means of transfer car 17.

Kiln car

Referring now particularly to Figures 2 and 3, the kiln car structure is shown. The car designated generally at 7 is constructed with a refractory bottom portion 21 mounted upon a framework 22 of steel or iron to which the wheels 23 resting on track 5 are journaled. The car deck 24 of high strength refractory is separated from the bottom portion 21 by means of transversely disposed refractory webs or partitions 25 (as more clearly shown in Figure 3), which latter form a series of transverse flues 26 through which the heated gases pass for under charge firing. This construction assures a uniform heating of the car load since heating over charge and under charge is accomplished.

The kiln cars are also provided with side walls 27 also of high strength refractory, which may be integral with the deck 24 or merely attached thereto to contain and protect packing material. The walls are of sufficient height to extend above the tops of the carbons 28 resting on the bed of packing material 29 on the car deck so that the required depth of packing material 29 may be maintained over the carbons.

The refractory base 21 of the car is provided on each side thereof with a recessed portion 30 extending the entire length of the car and adapted to receive a lateral flange 31 extending from each wall of the kiln throughout its length to seal off the undercarriage and track from the heat of the kiln.

In Figures 3 and 4, the ends of the car are indicated as open and the forwardly extending edge 32 of each car deck is recessed at 33 to receive an extension 34 of the car deck at the rear end of the preceding car. Thus, the side walls and car decks form a continuous longitudinal trough when assembled in end to end abutment in a train. This permits continuous feeding of packing material and facilitates loading and unloading of carbons. However, also in Figure 3 is shown an alternative construction where the car is provided with end walls 27a (shown in dotted line). The end and side walls may be integral, as shown, thus forming a box like frame, which may be removed from the deck for loading and unloading shapes and for removing packing material; or the end and side walls may be removably joined, in which case the ends are removed for loading and unloading shapes and for discharging packing material.

A switch contacting rail 20 is mounted on the undercarriage of the car 7 and extends outwardly and longitudinally along one side of the car a predetermined distance, as more clearly shown in Figure 8.

Packing material feeder and spreader

Referring to Figure 4, two kiln cars with adjacent ends abutting are shown in association with the packing material hopper and spreader for the bed layer upon which the shaped carbons are subsequently deposited. The hopper 35 is mounted above the track 5 so that the feed orifice 36 of the hopper lies directly over the deck 24 of a car in position under the hopper. An adjustable gate or spreader 37 is provided at the forward end of the hopper orifice, which in conjunction with the movement of the kiln car, spreads a uniform layer 38 of packing material on the car deck 24.

The packing material hopper and spreader 12, shown diagrammatically in Figure 1 is of similar construction to that described above.

Car loading mechanism

The mechanism for loading carbons onto the kiln cars for passage through the kiln will be described with particular reference to Figures 5 to 10, inclusive. The carbons are discharged from the pallet 2 (see Figure 1) on platform 3 by hydraulic pusher 6 onto the gravity roll storage conveyor 4. As shown in Figures 5 and 6 the conveyor is supported over track 5 by framework 40 and comprises five lanes of idle or gravity rolls 41 mounted in the side plates 42 of the conveyor frame.

Movable sections 43 of the frames and gravity rollers are hinged to side plates 42 at 44, thus being connected to the stationary section adjacent the discharge end of the conveyor. The hinged sections 43 are preferably located at a distance from the conveyor end substantially equal to one longitudinal row of carbons in terms of their subsequent position on the kiln cars. Opposite hinges 44, the movable sections are provided with depending links 45 secured to rocker arms 46 pivoted or journaled on shaft 47 extending through plates 42, the arms carrying at their other ends upwardly extending stops 48 positioned at the discharge end of the conveyor and centrally disposed between side plates 42. At the other extremities of the arms 46 is attached a transverse bar 49 adjacent to links 45. Bar 49 is operatively connected at two points with piston shafts 50 of air cylinders 51. Upon operation of the pistons 50 upwardly, the bar 49 is moved forcing the arms 46 at the adjacent end to move upwardly thus causing the stops 48 to be released by downward movement. In this manner a regulated number of carbons, for example, thirty-five in rows five wide by seven long, may be discharged onto the power conveyor 51a of the car loading mechanism. When the piston shafts 50 actuate the rocker arms to release the carbons, the pivoted or hinged sections 43 in each lane of the gravity conveyor are also tilted upward through links 45 out of the plane of the fixed sections, thus serving as a stop preventing further movement of the carbons on the conveyor above the hinged section while the predetermined number of carbons within the distance on the conveyor from the stop 48 to the hinged section 43 is discharged.

The loading mechanism 9 comprises a power conveyor 51 the frame plates 52 of which are bolted at 53 to the side plates 42 of the storage conveyor 4. At the opposite end of the power conveyor and attached to the frame plates 52 are a multiplicity of inclined loading or slide forks 54 over which the carbons are pushed by the conveyor when in operation to load a car. The conveyor is provided with driving chains 55 and runners 56 for the chains which pass over the drive sprockets 57 mounted on drive shaft 58 at the upper end of the conveyor the shaft 58 being driven by a motor (not shown) and over driven sprockets 59 on driven or tail shaft 60. Five sets of individual conveyors are shown in the drawings to accommodate five carbons in a transverse row, the length of each conveyor being equal to the distance occupied by a longitudinal row of carbons sufficient to constitute a full kiln car load, for example, a row of seven carbons.

The slide forks 54 are of a length to accommodate one or two transverse rows of carbons (one being shown in the drawings). Thus when the power conveyor operates to discharge a full load onto a kiln car there will always be one (or two) rows of carbons remaining on the slide forks for loading onto the succeeding car together with additional carbons fed from the storage conveyor 4 and moved down the power conveyor 51.

Referring to Figures 5 and 7, which illustrate one construction, the frames of the conveyor 51 and forks 54 are supported at their junction by upright overhead supports 61 to which is secured a transverse bar 63 extending between the supports and upon which a positive stop mechanism for the carbons on the conveyor 51 and forks 54 is mounted. The stop mechanism comprises a rocker arm 64 journaled on bar 63 for pivotal movement. The arm carries at one end through braces 65 a laterally extending member 66 to which is secured a plurality of longitudinal arms 67 having dependent extensions forming stop pins 68 at their ends. The stop pins 68 are adapted to be inserted into the cavities 69, known as stud holes, in the tops of the carbons of the transverse row resting on the slide forks 54.

The opposite end of the rocker arm 64 is operatively connected to the piston shaft 70 of an air cylinder 71, upon actuation of which the stop pins are retracted from the cavities 69 of the carbons or are inserted therein.

The kiln cars 7 are given a positive drive at the loading station by means of a drag chain 72 positioned between tracks 5 and carrying a follower or dog 73 for driving engagement with the underportion of the car indicated at 74.

As noted above, at all other points in the system the cars are hauled or pushed by means of a tractor type device except for feeding to and through the kiln, where conventional hydraulic pushers such as shown in Figure 1 at 6 are used.

When the cars are being loaded a forward impetus is given them by the thrust of the carbons and to compensate for this, braking strips 75 may be positioned on the floor between the tracks 5 and drag chain 72 for frictional engagement with the undercarriage of the car.

The operation of the loading mechanism will now be described in detail in conjunction with the control systems for indexing and synchronizing the movements of the power conveyor, carbon stops, and the kiln cars. Initially, with the carbon stops 68 engaging the cavities of the single row of carbons on the forks 54, and with the power conveyor empty before a kiln car is presented for loading, the gravity roll storage conveyor stops 48 are released after starting the power conveyor in operation. Thus, a full carload of carbons is released from the storage conveyor, for example, thirty-five in rows five wide by seven long, and is passed to the moving chains of conveyor 51 moving down into engagement with the row of carbons on the forks 54. The conveyor 51 is cut off after the blocks are sufficiently packed and to insure that the lines thereon are full.

A kiln car is then pushed up toward loading position for pickup by the drag chain 72. Referring now to Figures 8 and 9, it may be seen that a switch arm 80 with roller 81 is contacted by the first car by means of rail 20 extending from the side thereof as the car moves toward loading position in which it is shown in the drawing. The switch 82 closes which energizes motor 83 to drive the drag chain 72. Thus the positive drive for the car is initiated.

With reference to Figure 9, it may be seen that upon closing of switch 82 the circuit completed through motor 83 to power source 84 causes the solenoid 85 to be energized closing solenoid switch 86 and establishing a second parallel circuit from the power source 84 through drag chain motor 83. As a result, when switch 82 opens after a car has passed its position, the drag chain remains in operation positively moving the car forward. Switch 87, as shown in Figure 9 is normally closed. In Figure 8 this switch is shown at an indefinite distance from the car loading position on track 5. Upon contact of a car rail 20 with roller 88 on switch arm 89 of switch 87, the solenoid circuit is opened and the drag chain will cease operating, if switch 82 is also open, that is, if no car is moving up to loading position. On the other hand, if a car is being moved into position for pickup by the drag chain, switch 82 will be closed and motor 83 will continue to operate. It is only necessary that the switch arm 88 be clear of any car, that is, switch 87 be closed before switch 82 is opened during the passage of cars to and from the loading position to insure that the solenoid circuit will be operative to continue the motor drive after switch 82 is opened when there is a car in loading position. This can be insured by proper movement of the cars in pairs or groups into loading position and by proper spacing of the switch arms with respect to the loading position.

Referring again to Figure 8 and to Figure 10 with the drag chain positively moving the car into loading position, under the loading forks the rail 20 of the car actuates switch 90 through arm 91 and roller 92 which closes the circuit (shown in Figure 10) from power source 93 through a solenoid 94 which actuates the air valve 95 for cylinder 70 thus retracting stop pins 68 from the carbons on the loading forks 54. The stops are returned to the carbon cavities when switch 90 opens and 90a closes to actuate solenoid 94a which operates through valve 95 to reverse the piston of air cylinder 70.

As shown in Figure 7, the upward movement of one of the arms 67 of the carbon stops 68 trips switch 96 through switch arm 97 and roller 98 closing the circuit for the power conveyor motor. Thus, the power conveyor operates to discharge the full car load upon the car, the speeds of the car and conveyor being synchronized to deposit the carbons on the car deck evenly along the length thereof.

It is also a feature of this combined control that the speed of the conveyor may be varied relative to the car speed, thus increasing or decreasing (to a selected minimum) the spacing on the car deck between carbons of the several longitudinal rows.

The change in inclination between the slide forks and the car deck provides for a selected minimum spacing between carbons as shown in Figure 5 where the lowermost carbon, that is, the one on the car supports the top of the one on the forks which is inclined at an angle to the horizontal. Thus, adjustment of the angle of inclination of the forks provides a means for setting a desired minimum spacing for the carbons when discharged onto the car deck.

*Car unloading mechanism*

Referring to Figures 11 and 12, the car unloading mechanism is shown. It comprises supporting frames 100 for chain drive and driven sprockets 101 and 102, respectively about which a pair of endless chains 103 and 104 are passed. The sprockets are mounted on drive shaft 101a and driven shaft 102a. Intermediate the sprockets the chains ride within tracks 105 supported at 99 and held down at 99a. As shown in detail in Figure 13, a roller frame or large link 106 is interposed in each of the chains and carries rollers 107 riding in the tracks 105. A channel member 108 extends transversely between roller frames 106 and is secured thereto through gussets 109. The channels 108 carry dependent therefrom pusher arms 110 which are hinged or pivoted at 111, the pusher arms carrying a transverse push bar 112 which is adapted to contact the carbons on a kiln car.

An unloading chute 113 comprising a plurality of open work skid forks 114 is provided to receive the carbons from the car deck. The loaded car contains both baked carbons and packing material, and as the carbons are received onto the skid forks, the packing material drops between the forks back into the car where it is later removed.

With the car moving in the direction of the arrow shown in Figure 11, the rear carbons are contacted by the pusher bar and with the chains in operation by starting reversible motor 115 for the drive sprockets, the pusher bar 112 moves in the direction of movement of the kiln car and forces the carbon up the chute 113 across the skid forks 114. The unloaded carbons are positively moved from the end of the chute upward onto rollers 116 by the moving pusher bar 112 until the upper hinged end of one of the pusher arms 110 hits limit switch 117 reversing the drive motor and thus reversing the drive shaft 101a, sprocket 101, chains 103, driven sprockets 102 and shaft 102a. The pusher bar is thus reversed until it trips limit switch 118 in its return movement. Thus, the pusher bar reciprocates between the positions of the limit switches. As the bar returns, it may contact the load on a car moving into unloading position, but being hinged at 111, it swings above the carbons and merely drags in the packing material above the carbons, as shown at 119 in Figure 11.

The carbons unloaded to the point represented by the position of limit switch 117 are then transferred on gravity rolls 116 to a cleaning apparatus for removing adherent packing material. The rolls 116 may alternatively be driven rolls.

It is to be noted with reference to the foregoing description of the car loading and unloading mechanism, that the unloading mechanism of Figures 11, 12 and 13 can be adapted for loading carbons merely by reversing the pivotal direction of the pusher arms 110 and pusher bar 112 and the travel of the kiln cars. Thus, a regulated number of carbons could be fed by pusher bar 112 down the rolls 116 and skid forks 114 of chute 113 onto the car deck and the bar movement reversed in the same way with limit switches. The gravity rolls 116 provided with a proper stop such as 48 of Figure 5 would deliver a regulated number of carbons at selected intervals timed with the movement of the cars.

Conversely, the loading machine of Figures 5 and 6 could be used to unload carbons from the cars by reversing the direction of the cars and the chains of power conveyor 51 and by removing the stop mechanisms.

*Gas flow system*

Referring to Figure 14, there is shown a diagrammatic representation of one gas flow system for the kiln including the embodiment wherein the volatiles are directly burned in the combustion zone. The kiln 13 is composed of an entrance section 14, a heating zone 15 and a cooling zone 16. The burners 120, preferably oil burners, are disposed in the heating zone so that the gaseous products of combustion flow concurrent with the movement of the kiln cars as shown by the arrows. The exhaust gases are vented from the end of the heating zone through flue 121 and pass through gas to air heat exchanger 122 where cooling air is supplied through duct 123, which air is thus preheated and passed into the manifold 124 to provide a hot air supply for combustion of the fuel at the burners. A controlled portion of the cooled exhaust gases is vented through stack 125 while another portion is passed through a gas to water heat exchanger for further cooling and is led through duct 127 to the cooling zone of the kiln where it passes countercurrent to the kiln car loads thus reducing the temperature thereof and becoming reheated. The gases now heated again are vented from the cooling zone through flue 128 and from there are passed either to the stack 125 through branch stack 129 or are mixed with the hot exhaust gases from the heating zone in flue 121 by passage through duct 130. Dampers may be provided at 131 and 132 to control the flow whereby all or merely a portion of the gases may be passed directly up the stacks 125 and 129 or diverted to exchanger 126 and duct 130, respectively.

Air is passed through flues 133 in the kiln wall near the exit end to further cool the car loads by indirect heat exchange. The heated air is vented through flue 134 and can be passed to the duct 123 for the burner air supply.

Referring to Figure 15, there is shown another kiln and gas flow system in which the volatiles from the charge are indirectly used as fuel by collection from the preheating zone and reintroduction into the firing zone.

The kiln 13 is composed of an entrance vestibule 135 having an entrance door 136, a preheating zone 137, a firing zone 138, a cooling zone 139 and an exit vestibule 140, also provided with an exit door 141. Between vestibule 135 and preheating zone 137 is a second door 142, and between cooling zone 139 and exit 140 is a door 143. Burners 144a and 144b are located in firing zone 138 with fuel lines 145 connected to manifolds 158 for supplying burners 144a with oil or other suitable fuel from an external source. The balance of the fuel consists of volatiles distilled from the charge in preheating zone 137 and collected at the rear end thereof through exhaust 146 and passed through manifold 147 to burners 144b for combustion. Combustion gases from the burners pass concurrently to the direction of movement of the charge and are drawn off by exhaust duct 149 through duct 149a positioned in the kiln roof near the end of the firing zone. Duct 149 is connected to branch ducts or flues 150 and 151 in the preheating zone through which combustion gases pass thus preheating the charge. The combustion gases thus cooled are passed through lines 152 to the exit end of cooling zone 139 where they are passed at 153 countercurrent to the direction of movement of the charge thus cooling the latter progressively, and in direct contact therewith, and providing an inert or nonoxidizing atmosphere.

The cooling zone is provided with flues 154 and 155 through which fresh air is passed at 156 and 157 on its passage to manifolds 159 where it is distributed to burners 144a and 144b. The air passes countercurrent to the movement of the charge thus further cooling the same while being preheated for mixing with the fuel to support combustion at the burners.

The combustion gases are exhausted from the forward end of the cooling zone 139 at 160 where they are passed to an exhaust stack as shown in Figure 14 at 125. The sensible heat in these gases is preferably given up to the burner air before it enters manifolds 158 and 159 in a suitable gas to air heat exchanger such as shown at 122 in Figure 14.

The preheating zone and the cooling zone are substantially closed off from the firing zone by means of conventional dams 161 and 162.

Shown diagrammatically at 163 is a combustion gas by-pass in connection with duct 149a and branch ducts 150 and 151. This by-pass preferably removes a portion of the combustion gases from duct 149a whereby only the balance passes into ducts 150 and 151 for preheating the charge in zone 137. The by-passed portion of combustion gas may then be exhausted through a stack such as 125 shown in Figure 14, preferably passing through a suitable heat exchanger such as shown at 122 in Figure 14 for recovery of some of its thermal content.

In operating the kiln, a loaded kiln car is passed into vestibule 135 by opening door 136, which is then closed. The vestibule is then deaired by sweeping combustion gases from line 164 connected to duct 152 into the space and forcing air out through outlet 165 which is normally closed. Door 142 is then opened and the load car is introduced into the preheating zone.

For discharge from the kiln after the charge is sufficiently cooled door 143 is opened and the kiln car to be discharged is moved into vestibule 140 after which door 143 is closed. Exit door 141 is then opened and the car removed.

The foregoing procedures are adopted in order to preclude insofar as possible the entrance of air into either the preheating or cooling zone, particularly the former.

It is to be noted that the cooling gases are the products of combustion from the heating zone and this feature advantageously affords greater protection to the carbons from exposure to an oxidizing atmosphere, since the gaseous products of combustion are essentially non-oxidizing. Furthermore, this means of cooling consumes less packing material by reducing the oxygen concentration in the kiln gases in the cooling zone.

Also, the method of final cooling by indirect heat exchange with a fluid medium, such as air, further prevents combustion of packing material, when the same is combustible, for example, coke calcined by passage through the kiln.

As a result by preserving to a maximum degree the coke packing material, the process provides for the attainment of a dual objective, the preparation of baked carbon electrodes for electrolytic furnaces, such as, aluminum reduction pots, and the preparation of a calcined petroleum coke from the raw coke content of the packing material suitable as the raw material for preparing the green electrodes. In this regard, it is a noteworthy feature of the invention that the relative production capacity of the baked electrodes and calcined coke may be varied by increasing or decreasing the spacing of the carbons on the kiln cars by means of adjusting the relative speeds of the power conveyor of the loading mechanism and the kiln cars.

*The carbon and packing material*

The carbons for the electrodes of the exemplified embodiment of the invention are preferably composed of calcined petroleum coke with a coal tar pitch binder, the latter having a volatile content of approximately 30 percent of the pitch weight. This binder is usually employed in amounts approximating 17 percent of the green electrode weight, which gives a volatile content of about 5 percent based on the total weight of the electrode.

The packing material for the blanket employed to protect the electrodes preferably consists of petroleum coke ranging from 0 to 100 percent raw coke to 0 to 100 percent calcined coke. Preferably a blend of raw and calcined coke is used in the proportions of 60 percent raw, 40 percent calcined. However, the proportions vary with the volatile content of the raw coke which may be from 10 to 20 percent by weight.

In any event, the thermal value in the volatiles of the electrodes and the packing material is utilized by burning the same in the heating zone of the kiln as completely as possible.

Coke is advantageous as the packing material since it is combustible or oxidizable and therefore by chemical action prevents oxygen from contacting the heated electrodes by combining with the same. Accordingly, with coke or other carbonaceous packing material, it is necessary to hold the cars in the kiln in the inert atmosphere of combustion gases in the cooling zone until the baked electrodes and packing material are cooled below about 450° C., the combustion temperature of the coke or carbon.

Another type of packing material which is relatively inert or non-combustible type may be also advantageously employed. Various types of refractory material of suitable thermal conductivity such as gannister, crushed fire clay, crushed brick, sand or alumina may be utilized. In such case, the protecting layer of packing material would be somewhat deeper over the carbons, since the inert material would not prevent oxygen contact with the carbons by chemically combining therewith but merely by reason of its interposition between the carbons and the atmosphere in or outside the kiln. With the inert packing material, the kiln cars with the hot load could be removed from the kilns at temperatures in excess of the 450° C. combustion temperature of the ordinary coke packing, thus permitting an increased cooling rate and further increasing production capacity.

The system of the invention described in detail above embodies many advantages among which may be mentioned the uniformity and general improvement in the physical and electrical properties of the carbons, elimination of substantial handling of carbons by labor, the speed and accuracy of loading and unloading the kiln cars, the selective features of carbon spacing on the cars, and above all the very great reduction in the time required in the heating and cooling cycle leading to increased production capacity. In this regard, considering a 20° C. per hour heating rate, the carbons would attain a selected temperature of 1000° C. in fifty hours. With a cooling rate also of 20° C. per hour the carbons would attain a temperature of 400° C. for discharge from the kiln in thirty hours. Thus, in this illustration the complete baking cycle requires only eighty hours, as compared to from two to three weeks for one chamber of a ring furnace.

The invention, although specifically described with reference to carbon electrode baking, is not limited thereto, but embraces application of the system to any shaped combustible or oxidizable material, particularly shaped bodies of carbon, subjected to a heating or baking treatment. Also, the specific embodiments of the mechanisms such as unloading and loading, and the process of baking including heating, cooling and gas flow may be subjected to obvious and minor modifications and substitutions of equivalents without departing from the spirit of the invention which is intended to be covered and limited only by the claims appended hereto.

What we claim is:

1. A continuous method for the heat treatment of combustible shaped bodies which comprises depositing said bodies on a moving surface and covering the bodies with packing material to exclude oxygen therefrom, passing the body-loaded moving surfaces into a heating zone including a direct-fired combustion zone wherein the bodies are heated to a selected heat-treatment temperature by flowing the gaseous products of combustion in direct contact with said bodies, and passing the said bodies on the moving surfaces into a cooling zone wherein cooling is effected by contact with cooled combustion gases from the heating zone flowing countercurrent to the movement of the bodies.

2. A method according to claim 1 in which the heat-treated bodies are also cooled by indirect heat exchange with a fluid medium flowing in at least a portion of the periphery of said cooling zone.

3. A method according to claim 1 wherein the shaped bodies contain combustible volatiles emitted therefrom in the forward portion of said heating zone, and passing the volatiles to the combustion zone and burning the same therein as a portion of the fuel.

4. A method according to claim 1 wherein the shaped bodies and packing material contain combustible volatiles emitted therefrom in the forward portion of said heating zone, and passing the volatiles to the combustion zone and burning the same therein as a portion of the fuel.

5. A continuous method for the heat treatment of combustible shaped bodies containing combustible volatiles which comprises depositing said bodies on a moving surface containing a bed layer of packing material and covering the bodies with additional packing material to exclude oxygen therefrom, passing the moving surfaces carrying the charge into a heating zone comprising a preheating section and a firing section wherein there is communication of gases between the sections, initially heating the charge in the preheating zone whereby the major portion of volatiles is emitted therefrom, passing the charge on said surfaces into the firing section wherein heating to a selected final temperature is effected progressively by direct contact with combustion gases, and passing the volatiles from the charge into the firing section where the same are directly burned as fuel, passing the charge on the surfaces into a cooling zone wherein cooling is effected by direct contact with cooled combustion gases from the heating zone flowing countercurrent to the movement of the charge.

6. A method according to claim 5 wherein the packing material contains combustible volatiles emitted from the charge in the preheating zone, and burning these volatiles with those from the shaped bodies to increase the portion of fuel supplied by said charge.

7. A continuous method for the heat treatment of combustible shaped bodies containing combustible volatiles which comprises depositing said bodies on a moving surface containing a bed layer of packing material and covering the bodies with additional packing material to exclude oxygen therefrom, passing the moving surfaces carrying the charge into a heating zone comprising a preheating section and a firing section wherein communication of gases therebetween is precluded substantially, initially heating the charge in the preheating zone by indirect heat exchange with hot combustion gases from the firing zone whereby a major portion of the volatiles is emitted in said preheating zone, passing the charge on said surfaces into the firing section wherein heating to a selected final temperature is effected progressively by direct contact with combustion gases, collecting the volatiles in the preheating zone and introducing the same indirectly into the firing section wherein controlled combustion thereof is effected to supply a portion of the fuel, and cooling the charge by movement through a cooling zone wherein cooled combustion gases are passed in contact with and countercurrent to the charge whereby an inert atmosphere for the charge is provided during cooling.

8. A method according to claim 7 in which the charge is further cooled in the cooling zone by indirect heat exchange with air, said air being heated, then being introduced into the firing zone to support combustion of the fuel.

9. A method according to claim 7 wherein the packing material contains combustible volatiles emitted from the charge in the preheating zone, and burning these volatiles with those from the shaped bodies to increase the portion of fuel supplied by said charge.

10. A continuous method of calcining shaped carbon bodies containing combustible volatiles which comprises depositing green carbons on a moving surface containing a bed layer of packing material upon which the carbons rest, completely covering the carbons with packing material to a selected depth to exclude oxygen therefrom during heating and cooling, passing the charge of carbons and packing material into a heating zone comprising a preheating section and firing section, heating said charge in said preheating section by indirect heat exchange with combustion gases from the firing section whereby substantially all of the volatiles of the charge are emitted therefrom, passing the preheated charge to the firing section wherein the same is heated progressively to a selected final calcination temperature by direct contact with combustion gases, burning the volatiles of the charge in the firing zone to supply a portion of the fuel, cooling the charge by movement through a cooling zone wherein an inert atmosphere of cooled combustion gases is passed in contact with and countercurrent to the charge, and further cooling the charge by indirect heat exchange in said zone with air passing to said firing zone for supporting combustion therein.

11. A method according to claim 10 in which the volatiles from the charge are collected from said preheating zone and are indirectly introduced into the firing section wherein controlled combustion thereof furnishes a portion of the fuel.

12. In a tunnel kiln for heat treating shaped combustible bodies wherein the bodies are passed successively through heating and cooling zones on moving surfaces, and the kiln is direct fired, the gas flow system comprising concurrent flow of gaseous products of combustion with the moving load in the heating zone, exhausting the hot gaseous products of combustion at the end of the heating zone, passing the exhaust gases through a gas to air heat exchanger, said heated air from the heat exchanger being supplied to the kiln to support combustion of the fuel, passing the cooled exhaust gases from the heat exchanger to the cooling zone of the kiln, and flowing the cooled exhaust gases in direct contact with the heated load countercurrent to the movement thereof.

13. In a tunnel kiln for baking shaped carbon bodies wherein the carbons are passed succesively through heating and cooling zones on moving surfaces, the carbons are covered with protective combustible packing material, and the kiln is direct fired, the gas flow system comprising concurrent flow of combustion gases with the moving load in the heating zone, exhausting the combustion gases from the exit end of the heating zone, passing said combustion gases through a gas to air heat exchanger, said heated air from the heat exchanger being supplied to the heating zone of the kiln to support combustion of the fuel therein, passing the cooled exhaust gases from the heat exchanger to the cooling zone of the kiln, and flowing the cooled exhaust gases in direct contact with the heated load countercurrent to the movement thereof, and further cooling the load by indirect heat exchange at the exit end of the cooling zone with air flowing within the walls of the cooling zone, passing the air heated by the indirect heat exchange in the cooling zone into the said gas to air heat exchanger for further heating for supplying the same to the heating zone for combustion of fuel.

14. In a tunnel kiln for heat-treating shaped combustible bodies wherein the bodies protected by packing material are passed successively through preheating, firing and cooling zones and the kiln is direct fired, the gas flow system comprising concurrent flow of combustion gases in direct contact with the moving charge in the firing zone, passing the combustion gases from the firing zone into the preheating zone countercurrently for indirect heat exchange with the moving charge therein, passing the cooled combustion gas from the preheating zone to the cooling zone, flowing the gases in the cooling zone countercurrently and in direct contact with the moving charge, and passing air for supporting combustion in the firing zone in countercurrent indirect heat exchange relation with the charge in the cooling zone.

15. A gas flow system according to claim 14 wherein the packing material for the shaped bodies contains combustible volatiles evolved in the preheating zone, and passing said volatiles into the firing zone for combustion as fuel therein.

References Cited in the file of this patent

UNITED STATES PATENTS

| Number | Name | Date |
|---|---|---|
| 409,490 | Nungesser | Aug. 20, 1889 |
| 1,045,915 | Turner | Dec. 3, 1912 |
| 1,508,135 | Blount et al. | Sept. 9, 1924 |
| 1,525,130 | Hinsdale | Feb. 3, 1925 |
| 1,525,725 | Dressler | Feb. 10, 1925 |
| 1,541,099 | Barnebey et al. | June 9, 1925 |
| 1,621,222 | Robertson | Mar. 15, 1927 |
| 1,688,422 | Hyde | Oct. 23, 1928 |
| 1,716,956 | Hepburn et al. | June 11, 1929 |
| 1,738,039 | Cope et al. | Dec. 3, 1929 |
| 1,745,362 | Evans | Feb. 4, 1930 |
| 1,947,545 | Pugh | Feb. 20, 1934 |
| 2,386,835 | Beatty | Oct. 16, 1945 |
| 2,461,770 | Puccinelli | Feb. 15, 1949 |
| 2,523,025 | Jeppson et al. | Sept. 15, 1950 |

UNITED STATES PATENT OFFICE

CERTIFICATE OF CORRECTION

Patent No. 2,678,205                                   May 11, 1954

James D. Buhler et al.

It is hereby certified that error appears in the printed specification of the above numbered patent requiring correction and that the said Letters Patent should read as corrected below.

Column 6, line 40, for "carbon" read -- carbons --; line 45, for "leading station" read -- loading station --; column 8, line 26, for "wire" read -- wide --.

Signed and sealed this 14th day of April 1959.

(SEAL)
Attest:

KARL H. AXLINE
Attesting Officer

ROBERT C. WATSON
Commissioner of Patents